3,399,110
RECOVERY OF FIBROUS MATERIAL FROM WASTE WATERS OF THE PAPER, CARDBOARD AND CELLULOSE INDUSTRY BY ADDITION OF CONDENSATION OF UREA AND AN ALKYLENE-IMINE
Hans Sommer, Hofheim, Taunus, Herbert Bestian, Frankfurt am Main, and Dieter Bergmann, Munchberg, Upper Franconia, Germany, assignors to Farbwerke Hoechst Aktiengesellschaft vormals Meister Lucius & Bruning, Frankfurt am Main, Germany, a corporation of Germany
No Drawing. Filed Mar. 11, 1965, Ser. No. 439,092
Claims priority, application Germany, Mar. 14, 1964, F 42,338
2 Claims. (Cl. 162—190)

ABSTRACT OF THE DISCLOSURE

Fibrous material is recovered from waste waters in the paper, cardboard and cellulose industry, by adding to the waste water a nitrogenous product obtained by condensation of urea and an 1,2-alkylene imine or oligomer thereof having a substitutable hydrogen atom at the nitrogen atom, the nitrogenous product being added in an amount between 0.1 and 4% by weight of the solid and suspended particles.

In order to improve the flotation, a tendency to creaming-up is imparted to the solid and suspended particles present in the waste water by addition of various chemicals. It is presumed that the nature of the flotation process resides in the reciprocal actions of accumulated electric charge and surface-active power potentials as well as in the stabilization of the separation between water and solid particles provoked by the corresponding chemicals. The paper pulp present in the waste water is brought to the surface of the vessel by flotation, enriched there and after thickening used again for the production of paper.

In order to improve the flotation there have been used up to now, for example, sulfonated fatty matters, products containing animal glue and wax soaps. Frequently, components having a flocculating action are added which in combination with soaps or other surface-active substances are intended to improve the flotation.

In order to render the flotation process a secure method of operation and to ensure an optimal fiber recovery rate, a flotation auxiliary agent applicable in practice should show a uniform action under different and changing conditions, such, as they are caused by fluctuations usually occurring in the composition of matter, the filler portion, the colloid content, the electrolyte content and the pH-value of the waste waters. As is known, a large number of different substances used for improving the flotation are highly sensitive to fluctuations of this kind.

Moreover, it is known that some of the products used for the flotation as foamers and flocculants may cause undesirable secondary phenomena during the processing of the recovered pulp, such, for example, as uneven transparency, stains in the paper, slime formation caused by the attack of bacteria and sticking of the paper web to the press.

Now we have found that the flotation properties of waste waters of the paper, cardboard and cellulose industry can be improved excellently by addition of nitrogenous products obtained by condensation of 1,2-alkylene-imines and urea. The process of the invention improves the speed of flotation as well as the clearing effect and, in addition, constitutes an improvement from the economical point of view.

The nitrogenous products obtained by condensation of urea and 1,2-alkylene-imines carrying a substitutable hydrogen atom at the nitrogen atom and/or their oligomers are largely insensible to different compositions of the waste water and do not cause any undesirable secondary phenomena when the recovered fiber and filler portions are processed again.

It is especially surprising that, in contradistinction to the experience made up to now, the addition of surface-active substances is not required for the foam stabilization.

For carrying out the tests leading to the results specified in the table a waste water was used having a charge of 1600 mg. of solid and suspended particles per liter at a pH-value of 5.8. In order to determine the time of flotation 800 cc. of this waste water were introduced into a shaking cylinder and the flotation auxiliary agents were added. In each case, the whole was shaken under the same conditions, slightly evacuated and the flotation time measured in seconds.

According to the invention the products obtained by condensation of 1,2-alkylene-imines and urea are added to the aqueous suspension of the fibrous material in a quantity within the range from 0.1 to 4% referred to the solid and suspended particles.

The nitrogenous condensation products from 1,2-alkylene-imines and/or their oligomers and urea, which are water-soluble or self-emulsifying in water are obtained by reaction of the components. The reaction is usually carried out at a temperature within the range from about 40° to about 200° C. in the presence or in the absence of solvents or diluents, preferably in the presence of water. In order to accelerate the reaction acid catalysts may be used additionally. The advancing condensation of the products can be judged from the viscosity and the solubility of the condensation products in water.

As 1,2-alkylene-imines there may be used ethylene-imine, 1,2-propylene-imine, 1,2- or 2,3-butylene-imine or

| Test example No. | Additions of flotation auxiliary agents (in mg.) | Flotation time (in seconds) | Clearing effect judged visually | Yield in evacuated flotation cell (percent) |
|---|---|---|---|---|
| 1 | | Over 400 | Turbid (deposit) | 52.4 |
| 2 | 5 (comparative product containing animal glue) | 400 | Turbid | 61.2 |
| 3 | 10 (comparative product containing animal glue) | 400 | do | 62.1 |
| 4 | 5 (comparative product containing castor-oil) | 360 | do | 64.6 |
| 5 | 10 (comparative product containing castor-oil) | 360 | do | 65.1 |
| 6 | 5 condensation product from 1,2-alkylene-imine and urea | 90 | Almost clear | 79.0 |
| 7 | 10 condensation product from 1,2-alkylene-imine and urea | 38 | Clear | 84.5 |
| 8 | 10 polyethylene imine | 105 | Slight deposit | 75.2 |

2,2-dimethyl-ethylene-imine. Apart from the monomeric cyclic compounds there are also suitable the dimeric, trimeric and similar oligomeric forms, preferably oligomers of ethylene-imine and of 1,2-propylene-imine. The preparation of the oligomeric alkylene-imines is described in Houben-Weyl "Methoden der organischen Chemie," 4th edition, vol. XI/2, page 261.

We claim:

1. A process for improving the recovery of fibrous material from waste waters of the paper, cardboard and cellulose industry, which comprises adding to the waste water a nitrogenous product obtained by condensation of urea and a member selected from the group consisting of an 1,2-alkylene-imine, carrying a substitutable hydrogen atom at the nitrogen atom and oligomers thereof, wherein the nitrogenous product is used in an amount from 0.1 to 4% referred to the solid and suspended particles.

2. A process as claimed in claim 1, wherein a condensation product of 1 mol of urea and 1 mol of ethylene-imine is used as nitrogenous product.

References Cited

UNITED STATES PATENTS 3,131,144  4/1964  Nagan.
3,259,569  7/1966  Priesing _____ 210—54 X
3,345,253  10/1967  Bestian.

DONALL H. SYLVESTER, Primary Examiner.
H. R. CAINE, Assistant Examiner.